Dec. 11, 1951    R. C. WEIDINGER, SR    2,577,831
VEHICLE STEERING AND BRAKING MECHANISM
Filed Sept. 13, 1949    2 SHEETS—SHEET 1
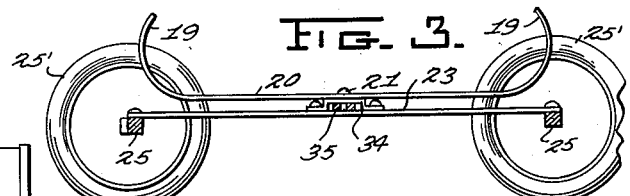
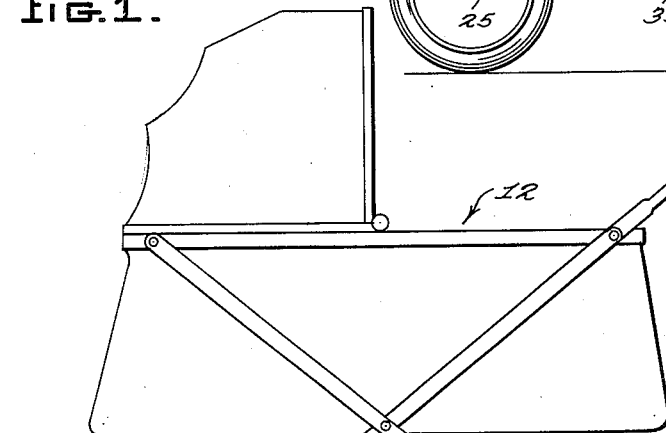
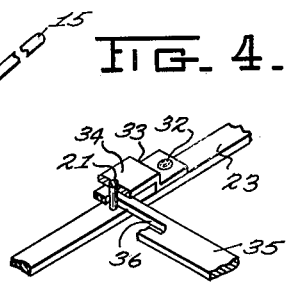
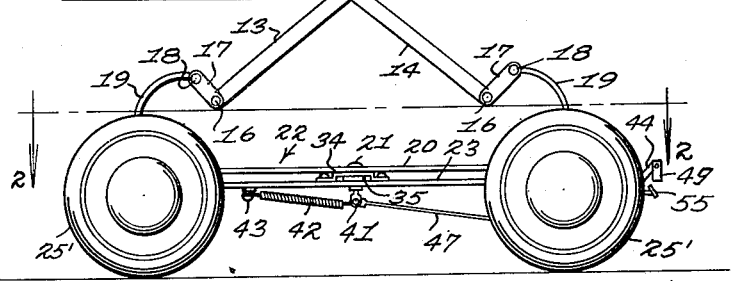
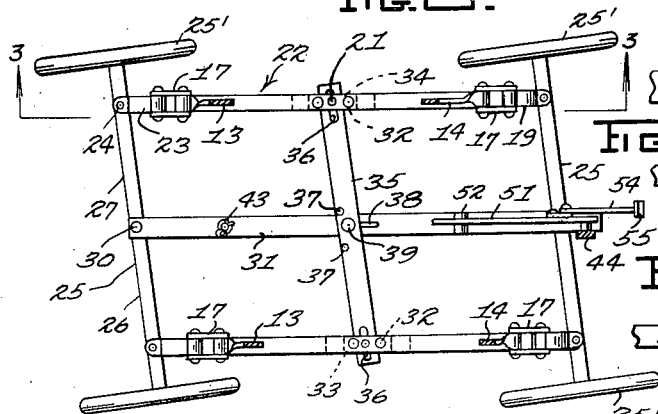
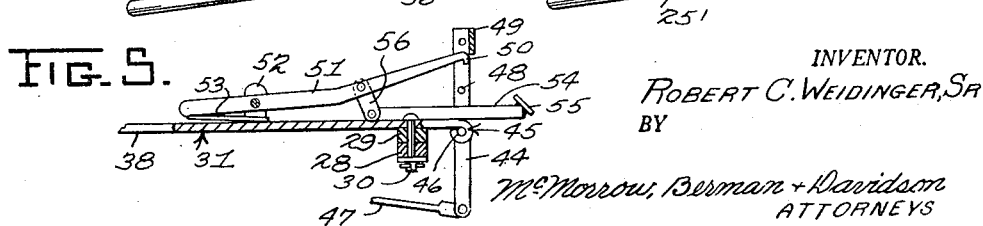
INVENTOR.
ROBERT C. WEIDINGER, SR
BY
McMorrow, Berman + Davidson
ATTORNEYS

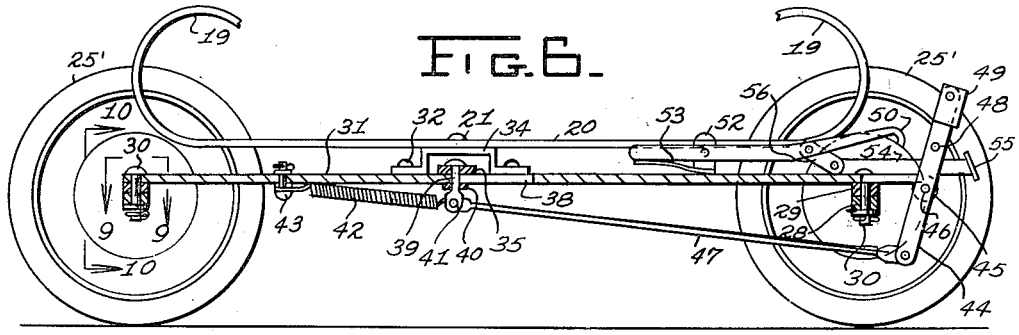
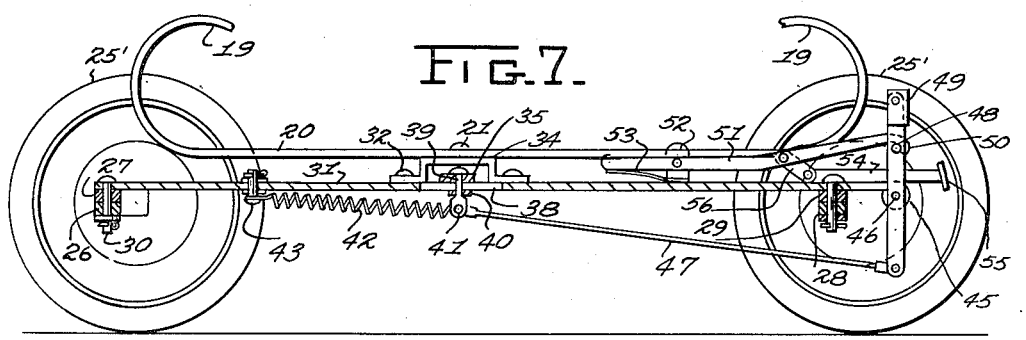
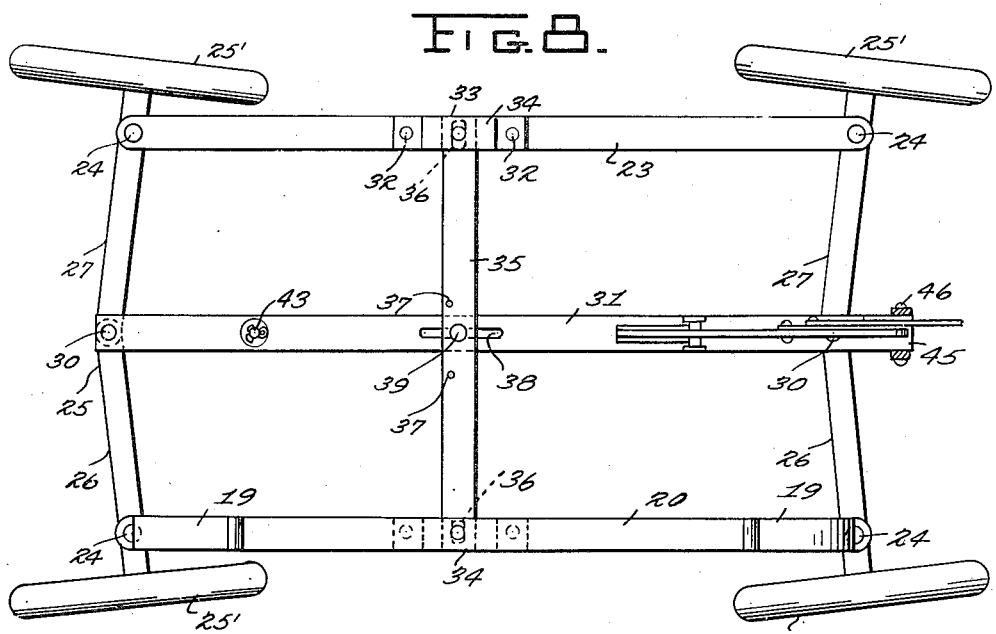

Patented Dec. 11, 1951

2,577,831

UNITED STATES PATENT OFFICE 2,577,831

VEHICLE STEERING AND BRAKING MECHANISM

Robert C. Weidinger, Sr., Norwalk, Ohio

Application September 13, 1949, Serial No. 115,459

8 Claims. (Cl. 280—48)

This invention relates to a wheeled vehicle chassis having portions which are movable to produce steering and braking action by means of changes in the relation of its wheels, the primary object of the invention being to provide a chassis of this character which is especially, but not exclusively, adapted for baby carriages and other light weight portable vehicles.

Another important object of the invention is to provide a chassis of the character indicated above involving a vehicle-pushing handle adapted to be grasped in the hands and stressed to either side to produce angulation of the wheels toward such side and resultant steering of the vehicle in a corresponding direction.

Another important object of the invention is the provision of a chassis of the character indicated above involving an arrangement of a hand or foot lever in conjunction with movable portions of the chassis, whereby movement of such lever can produce toeing out of the vehicle wheels in a manner to provide braking resistance to forward motion of the vehicle.

Other important objects and advantageous features of the invention will be apparent from the following description and the accompanying drawings, wherein, merely for purposes of illustration herein, a specific embodiment of the invention is set forth in detail.

In the drawings:

Figure 1 is a side elevation of a baby carriage embodying the present invention;

Figure 2 is a horizontal section taken on the line 2—2 of Figure 1, showing the wheels shifted toward the left for a left turn;

Figure 3 is a vertical longitudinal section taken on the line 3—3 of Figure 2;

Figure 4 is an enlarged fragmentary perspective detail;

Figure 5 is a vertical longitudinal section along one side of the braking lever and locking mechanism;

Figure 6 is a central vertical longitudinal sectional view, showing the braking lever and the locking element in unapplied positions;

Figure 7 is a view similar to Figure 6, showing the braking lever in applied position and the locking element effectively engaged therewith;

Figure 8 is a view similar to Figure 2, showing the braking lever applied and resultant changes in position of portions of the chassis frame providing toeing out or spreading of the wheels for braking effect;

Figure 9 is a fragmentary horizontal section taken on the line 9—9 of Figure 6;

Figure 10 is a transverse vertical section taken on the line 10—10 of Figure 6;

Figure 11 is a vertical longitudinal section, taken on the line 11—11 of Figure 9.

Referring in detail to the drawings, wherein like numerals designate like parts throughout the several views, the numeral 12 generally designates a vehicle body, in this instance a baby carriage body, having pairs of crossed and connected side members 13 and 14, the upper rear end of the members 13 being connected together by a transverse handle 15. The lower ends of the members 13 and 14 are pivoted at 16 to shackles 17 which are in turn pivoted at 18 to flexible spring horns 19 formed by oppositely-curving the ends of horizontal flat bar members 20 which extend in forward and rearward directions and are parallel. The flat bar members 20 are vertically traversed at their midpoints by headed pins 21.

The chassis proper, generally designated at 22, comprises two longitudinally-extending, horizontal side bars 23 which are parallelly spaced and are vertically traversed near their ends by headed pivot pins 24, which also traverse the laterally-outward ends of upper and lower transverse end bars 25. Ground-engaging wheels 25 are journaled on the outer ends of the end bars 25 at the outer sides of the side bars 23.

The end bars 25 comprise sections 26 and 27 which have vertically-staggered lower and upper circular ears 28 and 29, respectively, which are overlapped to form a hinge joint in conjunction with a vertical pin 30 traversing the same, as shown in Figures 9, 10 and 11.

The pin 30 also traverses the end of a middle longitudinal bar 31 which overlies the upper ear 29 of the end bar section 27, the arrangement being such that the side bars 23, 23 and the middle bar 31 are parallel in all position changes of the chassis 22.

At the mid-point of each side bar 23 is riveted, as indicated at 32 in Figures 4 and 6 to 8, a yoke 33 having a portion 34 parallelly spaced above and along the side bar, with the pin 21 extending downwardly therethrough to the bar 23. Positioned swingably and slidably in the spaces between the upper surfaces of the side bars 23 and the yoke portions 34 are the ends of a cross-bar 35, with the pins 21 passing through longitudinal slots 36 formed in the ends of the cross-bar 35. The cross-bar 35 overlies the middle bar 31 and has spaced pins 37, 37 to engage with the opposite edges of the middle bar 31, whereby relative movements of the cross-bar 35 and middle bar 31 are limited.

At the mid-point of the middle bar 31 is a longitudinal slot 38 through which depends a pivot pin 39 mounted on and vertically traversing the cross-bar 35. A washer 40 on the pin 39 bears against the under side of the middle bar 31 and the lower end of the pin 39 terminates in a clevis 41. A contractile helical spring 42 is stretched between the clevis 41 and an annular pin 43 traversing the middle bar 31 at a point spaced forwardly from the slot 38. The spring 42 normally holds the pin against the forward end of the slot 38, in which position the end bar sections 26 and 27 are longitudinally aligned and the pairs of wheels 25' are in their normal parallel relation.

The baby carriage 12 is mounted on the yokes 33 by means of the pins 21 traversing and fixed to the flat bar members 20. As a result, whenever the handle 15 is firmly grasped and swung toward the right or toward the left, the thrust and torque thus imposed upon the chassis side bars 23, 23 causes them to move longitudinally relative to each other. As a consequence, the end bars 25 and the cross-bar 35 assume related angular and parallel positions, as shown in Figure 2, with their wheels 25' angled toward the corresponding side of the chassis, so that forward motion of the vehicle will be at an angle to a straight, forward path, and the effect of a turning of the axes of the pairs of wheels 25' is obtained. Thus, the vehicle can be steered out of a straight, forward path by stressing the handle toward the right or toward the left. The spring 42 maintains the sections 26 and 27 of the end bars 25 in aligned relation through its rearward pull on the middle bar 31, which locks the hinge joints between the sections, these hinge joints being arranged to break forwardly only.

The pairs of wheels 25' can be toed out or spread to produce braking against forward motion of the vehicle, as shown in Figure 8, by displacing the middle bar 31 forwardly against the tension of the spring 42, as shown in Figure 7. Such displacement is in the present instance produceable by means of a braking lever 44 in the form of a clevis engaging opposite sides of a pin barrel 45 formed in the rear end of the middle bar 31, with a pivot pin 46 traversing the barrel and an intermediate part of the sides of the braking lever 44. A brake rod 47 has its forward end connected to the clevis 41 on the lower end of the pin 39 and its rear end connected to the lower end of the braking lever 44. Above its hinge point the braking lever has a lateral pin 48. On its upper end the lever has a swingable pedal 49.

The braking lever 44 normally occupies the rearwardly-tilted position shown in Figure 6. When a foot is placed on the pedal 49 and the lever pushed forwardly to spread the wheels 25' into braking position, the lever 44 reaches the upright position shown in Figure 7, and the middle bar 31 is displaced forwardly relative to the cross-bar 35, as can be seen from the position of the pin 39 in the middle bar slot 38. As the lever 44 moves forwardly toward the erect position, the lever pin 48 engages the rounded and down-curved hook 50 on the rear end of the latch lever 51 and cams the latch lever 51 upwardly until the pin 48 engages under the hook 50, whereby return of the braking lever toward its initial or normal position is prevented, and the spread, braking positions of the wheels 25' are maintained.

The latch lever 51 extends forwardly along the rear part of the middle bar 31 and is pivotally supported near its forward end on a lug 52 rising from the middle bar 31. A leaf spring 53 interposed between the middle bar 31 and the latch lever forwardly of its pivotal point maintains the hooked rear end of the latch lever yieldably pressed downwardly to maintain locking engagement of the hook 50 with the braking lever pin 48.

For releasing the latch lever 51, a slide bar 54 having a pedal 55 on its rear end slides on the middle bar 31 beneath the latch lever 51 and has its forward end connected to the latch lever 51 by a toggle link 56. Forward pressure upon the rear end of the slide bar 54 results in upward tilting of the latch lever 51 against the resistance of the spring 53 and disengagement of the hook 50 from the braking lever pin 48, and permits the spring 42 to return the braking lever 44 and the middle bar 31 to normal positions, in which the end bar sections 26 and 27 resume alignment and the pairs of wheels 25' return to normal parallel relation from spread braking positions.

I claim:

1. A vehicle chassis comprising two horizontal parallelly-spaced longitudinal side bars, end bars extending between and pivotally connected to the forward and rearward ends of said side bars, each of said end bars having a pair of laterally-spaced ground engaging wheels thereon whose axes are normally at right angles to said side bars, a longitudinal middle bar parallel to and spaced between said side bars and pivoted at its ends to said end bars intermediate their ends, and handle means connected to said side bars and arranged to be stressed toward either side of said chassis in a manner to move said side bars longitudinally relative to each other and thereby produce angulation of said end bars and their pairs of wheels relative to said side bars so as to steer said chassis for forward or rearward movement over the ground in a path to one side of its normal path of movement, said end bars each comprising two normally-longitudinally-aligned sections each mounting one of the related pairs of wheels, means pivoting the inner ends of said sections together and to the adjacent ends of said middle bar, a cross-bar extending between and intersecting said side bars, first pin-and-slot means connecting the ends of said cross-bar with said side bars permitting limited lateral and longitudinal movement of said cross-bar relative to said side bars, second pin-and-slot means connecting said cross-bar with said middle bar and permitting limited pivotal and longitudinal movement of said middle bar relative to said cross-bar, spring means normally holding said middle bar in the forwardmost position permitted by said second pin-and-slot means and wherein said end bar sections are maintained in alignment, and braking lever means mounted on said middle bar and operatively connected to said cross-bar, said braking lever being arranged to be moved out of an initial position determined by said spring means to an applied position on which said middle bar is displaced forwardly relative to said cross-bar and against the tension of said spring means and wherein said end bar sections are angled forwardly away from their aligned positions and the wheels of the selected pairs are toed out to resist forward movement of the chassis over the ground.

2. A vehicle chassis comprising two horizontal, parallelly-spaced longitudinal side bars, end bars extending between and pivotally connected to the forward and rearward ends of said side bars, each of said end bars having a pair of laterally-spaced, ground-engaging wheels thereon whose axes are normally at right angles to said side bars, a longitudinal middle bar parallel to and spaced between said side bars and pivoted at its ends to said end bars intermediate their ends, and handle means connected to said side bars and arranged to be stressed toward either side of said chassis in a manner to move said side bars longitudinally relative to each other and thereby produce angulation of said end bars and their pairs of wheels, relative to said side bars, so as to steer said chassis for forward or rearward movement over the ground in a path to one side of its normal path of movement, said end bars each comprising two normally-longitudinally-aligned sections each mounting one of the related pairs of wheels, means pivoting the inner ends of said sections together and to the adjacent ends of said middle bar, a cross-bar extending between and intersecting said side bars, first pin-and-slot means connecting the ends of said cross-bar with said side bars permitting limited lateral and longitudinal movement of said cross-bar relative to said side bars, second pin-and-slot means connecting said cross-bar with said middle bar and permitting limited pivotal and longitudinal movement of said middle bar relative to said cross-bar, spring means normally holding said middle bar in the forwardmost position permitted by said second pin-and-slot means and wherein said end bar sections are maintained in alignment, and braking lever means mounted on said middle bar and operatively connected to said cross-bar, said braking lever means being arranged to be moved out of an initial position determined by said spring means to an applied position in which said middle bar is displaced forwardly relative to said cross-bar and against the tension of said spring means and wherein said end bar sections are angled forwardly from their aligned positions and the wheels of the related pairs are toed out to resist forward movement of the chassis over the ground, spring-actuated latch means arranged to be operative to lockingly engage said braking lever by movement of said braking lever from initial to applied position.

3. A vehicle chassis comprising two horizontal, parallelly-spaced longitudinal side bars, end bars extending between and pivotally connected to the forward and rearward ends of said side bars, each of said end bars having a pair of laterally-spaced, ground-engaging wheels thereon whose axes are normally at right angles to said side bars, a longitudinal middle bar parallel to and spaced between said side bars and pivoted at its ends to said end bars intermediate their ends, and handle means connected to said side bars and arranged to be stressed toward either side of said chassis in a manner to move said side bars longitudinally relative to each other and thereby produce angulation of said end bars and their pairs of wheels relative to said side bars so as to steer said chassis for forward or rearward movement over the ground in a path to one side of its normal path of movement, said end bars each comprising two normally-longitudinally-aligned sections each mounting one of the related pair of wheels, means pivoting the inner ends of said sections together and to the adjacent ends of said middle bar, a cross-bar extending between and intersecting said side bars, first pin-and-slot means connecting the ends of said cross-bar with said side bars permitting limited lateral and longitudinal movement of said cross-bar relative to said side bars, second pin-and-slot means connecting said cross-bar with said middle bar and permitting limited pivotal and longitudinal movement of said middle bar relative to said cross-bar, spring means normally holding said middle bar in the forwardmost position permitted by said second pin-and-slot means and wherein said end bar sections are maintained in alignment, and braking lever means mounted on said middle bar and operatively connected to cross-bar, said braking lever being arranged to be moved out of an initial position determined by said spring means to an applied position on which said middle bar is displaced forwardly relative to said cross-bar and against the tension of said spring means and wherein said end bar sections are angled forwardly away from their aligned positions and the wheels of the related pairs are toed out to resist forward movement of the chassis over the ground, spring-actuated latch means arranged to be operated to lockingly engage said braking lever by movement of said braking lever from initial to applied position, and pedal-operated releasing means movable from an initial position to engage said latch means and disengage said latch means from said braking lever and permit said spring means to return said braking lever to initial position and move said middle bar rearwardly relative to said cross-bar so as to return the end bar sections into alignment wherein the wheels are paired in parallel positions.

4. A vehicle chassis comprising two horizontal, parallelly-spaced longitudinal side bars, end bars extending between and pivotally connected to the forward and rearward ends of said side bars, each of said end bars having a pair of laterally-spaced, ground-engaging wheels thereon whose axes are normally at right angles to said side bars, a longitudinal middle bar parallel to and spaced between said side bars and pivoted at its ends to said end bars intermediate their ends, and handle means connected to said side bars and arranged to be stressed toward either side of said chassis in a manner to move said side bars longitudinally relative to each other and thereby produce angulation of said end bars and their pairs of wheels relative to said side bars so as to steer said chassis for forward or rearward movement over the ground in a path to one side of its normal path of movement, said end bars each comprising two normally-longitudinally-aligned sections each mounting one of the related pairs of wheels, means pivoting the inner ends of said sections together and to the adjacent ends of said middle bar, a cross-bar extending between and intersecting said side bars, first pin-and-slot means connecting the ends of said cross-bar with said side bars permitting limited lateral and longitudinal movement of said cross-bar relative to said side bars, second pin-and-slot means connecting said cross-bar with said middle bar and permitting limited pivotal and longitudinal movement of said middle bar relative to said cross-bar, spring means normally holding said middle bar in the forwardmost position permitted by said second pin-and-slot means and wherein said end bar sections are maintained in alignment, and braking lever means mounted on said middle bar and operatively connected to said cross-bar, said braking lever being arranged to be moved out of an initial position determined by said spring means to an applied position in which said middle bar is displaced forwardly relative to said cross-bar and against the tension of said spring means and wherein said end bar sections are angled forwardly away from their aligned positions and the wheels of the related pairs are toed out to resist forward movement of the chassis over the ground, hinge joints connecting the inner ends of said end bar sections having means to prevent rearward angling of said sections from aligned relation and permit forward angling of said sections from aligned relation upon forward shifting of said middle bar relative to said cross bar.

5. A vehicle chassis comprising a pair of side bars arranged in spaced parallel relation, a first end bar extending transversely of said side bars contiguous to one end thereof and pivotally connected thereto, a second end bar extending transversely of said side bars contiguous to the other end thereof and pivotally connected thereto, said first and second end bars each comprising a pair of sections disposed in end to end aligned relation with respect to each other and having their confronting ends connected together for movement about a pivotal axis to a position out of alignment with respect to each other, a wheel journaled on the non-confronting ends of each of said sections, a longitudinally extending middle bar disposed intermediate said side bars and having one end connected to the pivotal axis of the sections of said first end bar and having the other end connected to the pivotal axis of the sections of said second end bar, a cross bar extending between said bars and mounted on the latter for limited movement transversely thereof, means operatively connected to said cross bar and said middle bar for maintaining the respective sections of said first and second end bars in said position in alignment, and actuating means operatively connected to said last named means for effecting the movement of the respective sections of said first and second end bars to said position out of alignment.

6. A vehicle chassis comprising a pair of side bars arranged in spaced parallel relation, a first end bar extending transversely of said side bars contiguous to one end thereof and pivotally connected thereto, a second end bar extending transversely of said side bars contiguous to the other end thereof and pivotally connected thereto, said first and second end bars each comprising a pair of sections disposed in end to end aligned relation with respect to each other and having their confronting ends connected together for movement about a pivotal axis to a position out of alignment with respect to each other, a wheel journaled on the non-confronting ends of each of said sections, a longitudinally extending middle bar disposed intermediate said side bars and having one end connected to the pivotal axis of the sections of said first end bar and having the other end connected to the pivotal axis of the sections of said second end bar, a cross bar extending between said side bars and mounted on the latter for limited movement transversely thereof, means operatively connected to said cross bar and said middle bar for maintaining the respective sections of said first and second end bars in said position in alignment, and actuating means operatively connected to said last named means for effecting the movement of the respective sections of said first and second end bars to said position out of alignment, said first named means comprising a pin having one end fixedly secured to said cross bar and having its other end extending through a longitudinal slot provided in the adjacent portion of said middle bar, and resilient means operatively connected to said other end of said pin and said middle bar for urging said pin to a limiting position in said slot corresponding to said position of alignment.

7. A vehicle chassis comprising a pair of side bars arranged in spaced parallel relation, a first end bar extending transversely of said side bars contiguous to one end thereof and pivotally connected thereto, a second end bar extending transversely of said side bars contiguous to the other end thereof and pivotally connected thereto, said first and second end bars each comprising a pair of sections disposed in end to end aligned relation with respect to each other and having their confronting ends connected together for movement about a pivotal axis to a position out of alignment with respect to each other, a wheel journaled on the non-confronting ends of each of said sections, a longitudinally extending middle bar disposed intermediate said side bars and having one end connected to the pivotal axis of the sections of said first end bar and having the other end connected to the pivotal axis of the sections of said second end bar, a cross bar extending between said side bars and mounted on the latter for limited movement transversely thereof, means operatively connected to said cross bar and said middle bar for maintaining the respective sections of said first and second end bars in said position in alignment, actuating means operatively connected to said last named means for effecting the movement of the respective sections of said first and second end bars to said position out of alignment, and latch means engageable with said actuating means for releasably securing the latter in a position corresponding to said position out of alignment of the respective sections of said first and second end bars.

8. A vehicle chassis comprising a pair of side bars arranged in spaced parallel relation, a first end bar extending transversely of said side bars contiguous to one end thereof and pivotally connected thereto, a second end bar extending transversely of said side bars contiguous to the other end thereof and pivotally connected thereto, said first and second end bars each comprising a pair of sections disposed in end to end aligned relation with respect to each other and having their confronting ends connected together for movement about a pivotal axis to a position out of alignment with respect to each other, a wheel journaled on the non-confronting ends of each of said sections, a longitudinally extending middle bar disposed intermediate said side bars and having one end connected to the pivotal axis of the sections of said first end bar and having the other end connected to the pivotal axis of the sections of said second end bar, a cross bar extending between said side bars and mounted on the latter for limited movement transversely thereof, means operatively connected to said cross bar and said middle bar for maintaining the respective sections of said first and second end bars in said position in alignment, actuating means operatively connected to said last named means for effecting the movement of the respective sections of said first and second end bars to said position out of alignment, latch means engageable with said actuating means for releasably securing the latter in a position corresponding to said position out of alignment of the respective sections of said first and second end bars, and release means operatively connected to said latch means for urging the latter out of engagement with said actuating means.

ROBERT C. WEIDINGER, Sr.

REFERENCES CITED

The following references are of record in the file of this patent:

UNITED STATES PATENTS

| Number | Name | Date |
| --- | --- | --- |
| 2,437,816 | Hekman et al. | Mar. 16, 1948 |
| 2,437,823 | Johkhoff | Mar. 16, 1948 |